A. J. GASTLIN.
HOOF PROTECTOR.
APPLICATION FILED JUNE 2, 1910.

980,094.

Patented Dec. 27, 1910.

WITNESSES:
H. T. Walker
John K. Braeuorgel

INVENTOR
Albert J. Gastlin
BY
ATTORNEYS

UNITED STATES PATENT OFFICE.

ALBERT JOHN GASTLIN, OF NEW YORK, N. Y.

HOOF-PROTECTOR.

980,094.  Specification of Letters Patent.  Patented Dec. 27, 1910.

Application filed June 2, 1910. Serial No. 564,559.

*To all whom it may concern:*

Be it known that I, ALBERT JOHN GASTLIN, a citizen of the United States, and a resident of the city of New York, Greenpoint, borough of Brooklyn, in the county of Kings and State of New York, have invented a new and Improved Hoof-Protector, of which the following is a full, clear, and exact description.

This invention relates to hoof protectors for preventing injury to the under part of the hoofs and the frogs of draft or other animals, and has reference more particularly to a device of this class which comprises relatively movable guard members adapted to be positioned under the hoof, within the shoe thereon, means for spreading the members outward against the sides of the shoe, and a common guard member movably associated with the first guard members and adapted to cover a gap between the same when they are spread in position.

The object of the invention is to provide a simple, strong and durable hoof guard, which can be used for horses or other animals usually provided with shoes, which can be easily placed in position and removed, which tends to prevent injury to the under part of the hoof and the frog of the hoof of the animal, by sharp stones or the like, which when placed in position will tend to remain securely held against accidental displacement, by means of which the entire under part of the hoof can be thoroughly protected, and which is so constructed that when in place it presents no gaps or openings through which an injury might be caused.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1:
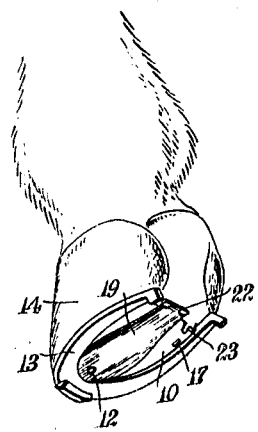
Figure 2:
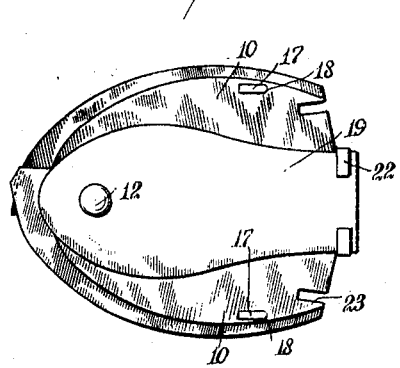
Figure 3:
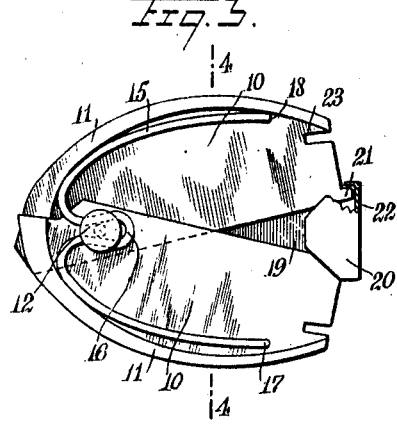
Figure 4:
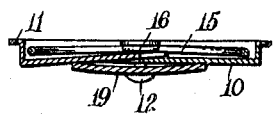
Figure 5:
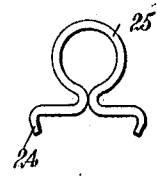

Figure 1 is a perspective view of a hoof of a horse, having an embodiment of my invention applied thereto; Fig. 2 is an inverted plan view of the device; Fig. 3 is a top plan view of the device, having a part broken away; Fig. 4 is a transverse section on the line 4—4 of Fig. 3; and Fig. 5 is a plan view of a tool used in manipulating the protector.

Before proceeding to a more detailed explanation of my invention, it should be clearly understood that while the protector can be used to guard the hoofs of different kinds of animals, it is particularly useful in connection with the hoofs of horses, which are usually provided with shoes of the conventional form. The structure is adapted to be positioned within the shoe and to spread outwardly against the sides thereof and under the same, so that it can be conveniently held in place to cover the entire under part of the hoof within the shoe. It thus serves to guard the entire under part of the hoof and the frog from injury. It is preferably fashioned from sheet metal, stamped or otherwise suitably shaped. As it spreads outwardly against the shoe, the protector will adapt itself to fit hoofs and shoes of different sizes. The common guard member permits the protector to accommodate itself to hoofs of different sizes, without leaving gaps or openings, as the common member extends over the adjacent portions of the other guard members between which a gap might occur.

Certain of the details of construction form no part of the invention, and can be varied in accordance with individual preference and special conditions, without departing from the underlying spirit of the invention.

Referring more particular to the drawings, I provide similar guard plates or members 10, having the adjacent edges substantially straight, and provided at the opposite, curved edges with offset flanges 11. A rivet 12 or the like pivotally connects the members 10 near one end. The flanges 11 serve to engage under the horseshoe 13 when the protector is arranged under the hoof 14, between the sides and within the horseshoe. The plates may be somewhat curved or shaped to conform to the hoof and the frog, if so desired. The offset form of the flanges permits the plates to be positioned slightly spaced from the under part of the hoof. I employ a spring 15, of U-form, having near the middle, an inwardly disposed bend 16, which receives the rivet 12, and is located under the head thereof. The arms of the spring 15 are located adjacent to the flanges 11, and tend to spread the members 10 outwardly against the sides of the shoe, and thus serve to secure the protector in place. The ends 17 of the spring are passed through openings 18 in the members 10 and are rearwardly folded, so that the spring is secured against displacement.

A common guard plate or member 19 of elongated, and at one end, preferably rounded form, is pivotally associated with the members 10, being secured thereto by means of the rivet 12. It has the end 20 remote from the rivet, rearwardly disposed and offset, extending over the corresponding adjacent ends of the members 10. These have projections 21. The end 20 of the member 19 has at opposite sides lugs or extensions 22 which are folded laterally and inwardly at the sides of the member, and constitute stops adapted to be engaged by the projections 21, to limit the outward relative movement or spreading of the members 10. At the ends of the flanges 11, the members 10 have notches or recesses 23. These are adapted to be engaged by the laterally disposed ends 24 of an implement 25 of any suitable form. The implement can be employed to hold the members 10 together against the tension of the spring when the protector is being placed in position or is being removed from the hoof.

Having thus described my invention, I claim as new, and desire to secure by Letters Patent:

1. A device of the class described, comprising relatively movable guard members adapted to be positioned under the hoof, within the shoe, means for spreading the members outwardly against the sides of the shoe, and a common guard member movably associated with said first members, adapted to cover a gap between the same when they are in position, and a common pivotal connection for all of said guard members.

2. A device of the class described, comprising relatively movable guard members adapted to be positioned under the hoof, and within the shoe, a spring secured to said members and tending to spread the same outwardly against the sides of the shoe, a common guard member movably associated with said first members and adapted to cover a gap between the same when they are in position, and a common pivotal connection for all of said guard members.

3. A device of the class described, comprising relatively movable guard members adapted to be positioned under the hoof, within the shoe, means for spreading the members outwardly against the sides of the shoe, and a common guard member movably associated with said first members, and adapted to cover a gap between the same when they are in position, said common member having means for limiting the spreading of said first members.

4. A device of the class described, comprising relatively movable guard members adapted to be positioned under the hoof, and within the shoe, a spring secured to said members and tending to spread the same outwardly against the sides of the shoe, and a common guard member movably associated with said first members and adapted to cover a gap between the same when they are in position, said common member having stops adapted to be engaged by said first members, and serving to limit the spreading thereof.

5. A device of the class described, comprising pivotally connected guard members having at the opposite edges, offset flanges, said members being adapted to be positioned under a hoof, within a shoe, and to have said flanges engage the shoe, a spring having arms arranged adjacent to said flanges and secured to said members, said spring serving to spread said members, and a common guard member pivotally associated with both of said first members, and adapted to cover a gap between the same when they are in position, said common member having at the sides, stops, said first members having projections adapted to engage said stops, whereby the spreading of said first members is limited.

6. A device of the class described, comprising guard members having at the opposite edges offset flanges, said members being adapted to be positioned under a hoof, within a shoe, and to have said flanges engage the shoe, a headed member for pivotally connecting said guard members, a spring having arms arranged adjacent to said flanges and having an inwardly disposed bend receiving said headed member, said spring having the ends secured to said guard members, and a common guard member pivotally associated by means of said headed member, with both of said first-named guard members and adapted to cover a gap between the same when they are in position, said common member having an end inwardly disposed, and offset to the other side of said first-named guard members, and having at the sides, stops, said first-named members having projections adapted to engage said stops between said common guard member and said inwardly disposed part thereof, whereby the spreading of said first members is limited.

In testimony whereof I have signed my name to this specification in the presence of two subscribing witnesses.

ALBERT JOHN GASTLIN.

Witnesses:
 JOHN K. BRACHVOGEL,
 PHILIP D. ROLLHAUS.